Oct. 15, 1968  N. W. MAPHAM ET AL  3,406,327
ELECTRIC POWER INVERTER HAVING A WELL REGULATED, NEARLY
SINUSOIDAL OUTPUT VOLTAGE
Filed May 27, 1965  3 Sheets-Sheet 1
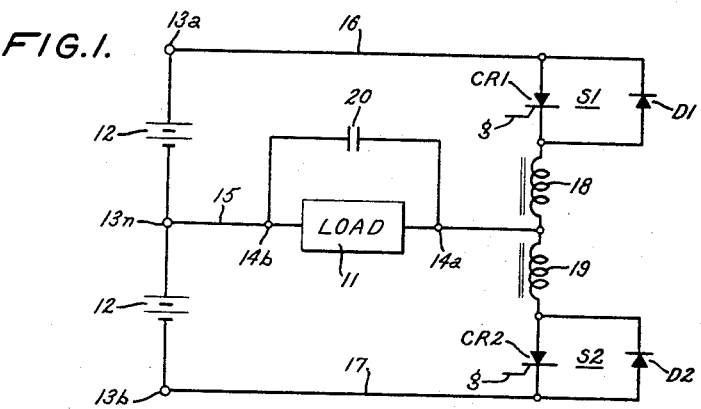
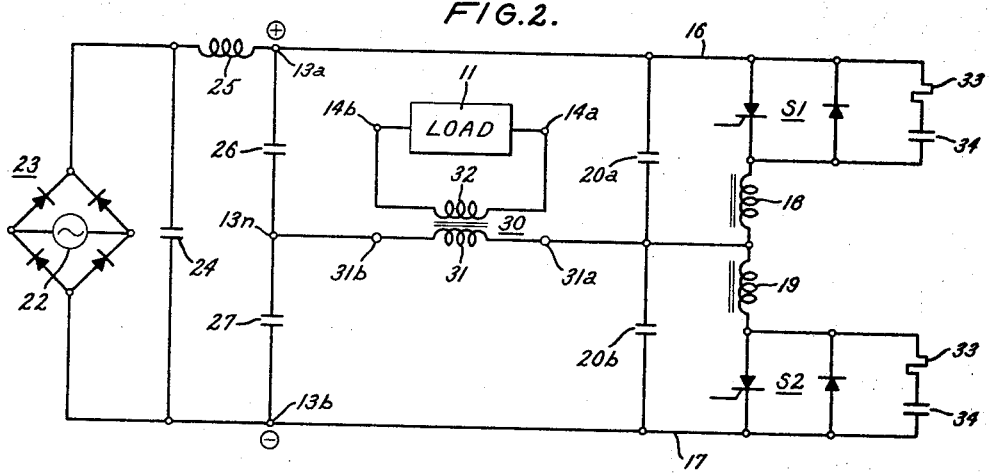
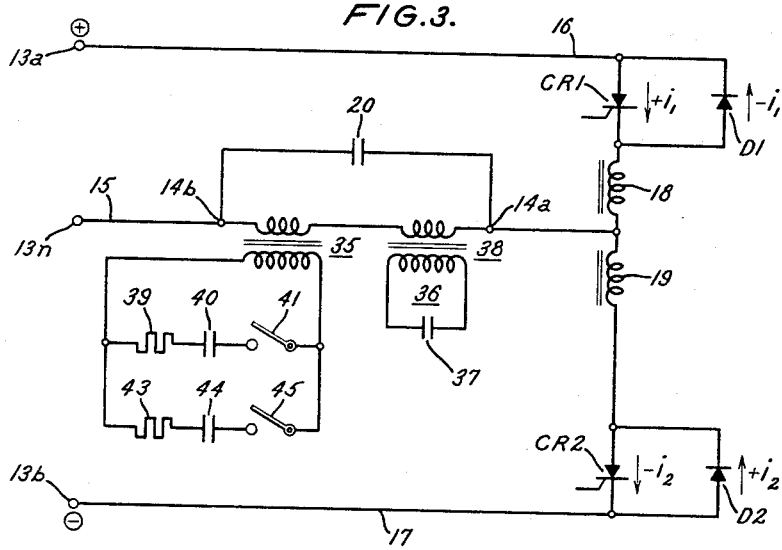
INVENTORS:
NEVILLE W. MAPHAM
FRED W. KELLEY, JR.
BY Albert S. Richardson Jr.
ATTORNEY

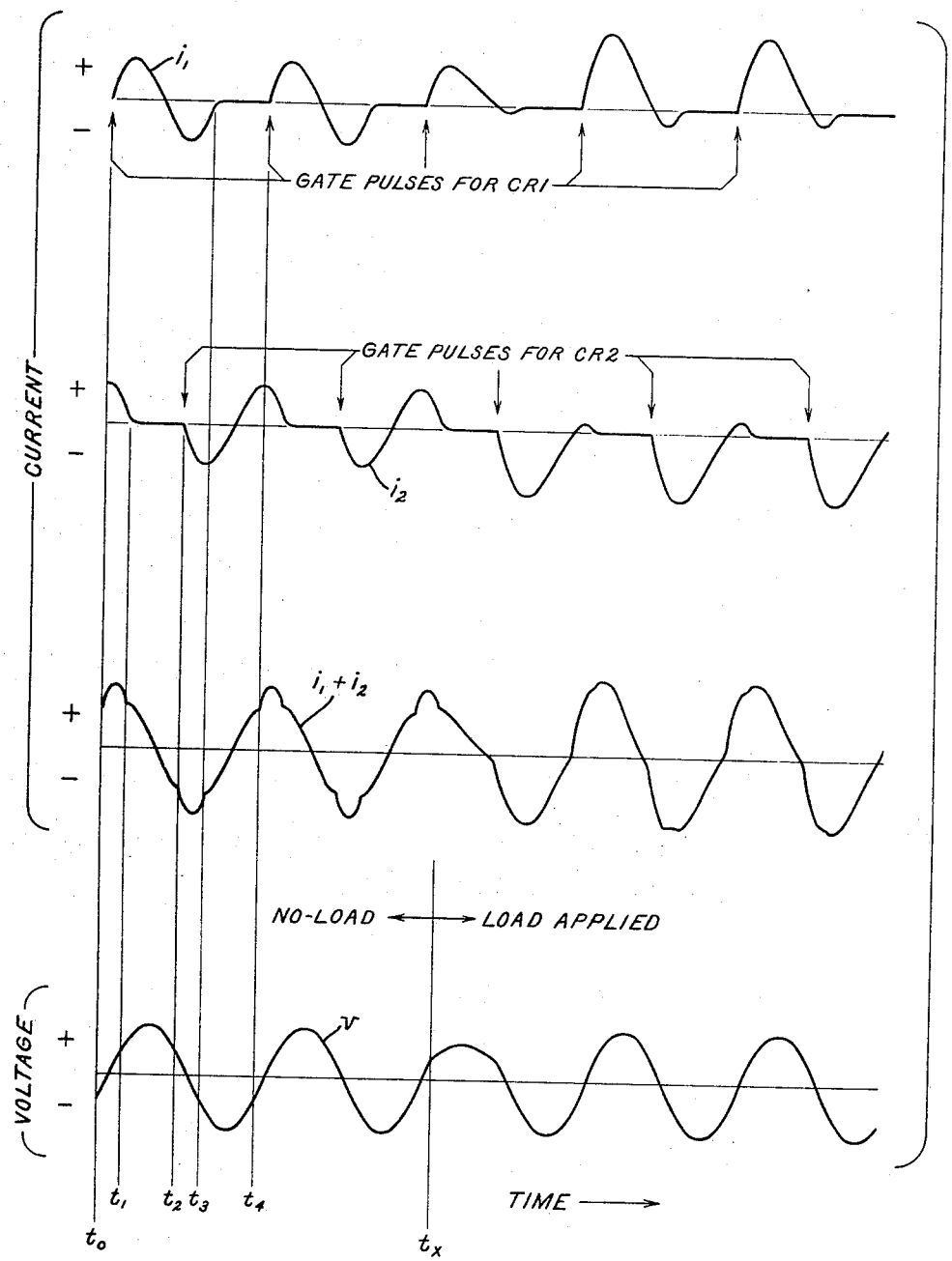

INVENTORS:
NEVILLE W. MAPHAM
FRED W. KELLEY, JR.

BY Albert S. Richardson Jr.
ATTORNEY

United States Patent Office 3,406,327
Patented Oct. 15, 1968

3,406,327
ELECTRIC POWER INVERTER HAVING A WELL REGULATED, NEARLY SINUSOIDAL OUTPUT VOLTAGE
Neville W. Mapham, Jordan, N.Y., and Fred W. Kelley, Jr., Media, Pa., assignors to General Electric Company, a corporation of New York
Filed May 27, 1965, Ser. No. 459,225
12 Claims. (Cl. 321—45)

ABSTRACT OF THE DISCLOSURE

In electric power apparatus designed to supply an A-C load from a D-C source, the load is paralleled by a capacitor and is connected to the source via alternately triggered bidirectionally conducting switching elements respectively in series with separate inductors, whereby a complementary pair of resonant circuits are formed. Each resonant circuit is tuned to a frequency that is about 1.35 times higher than the operating frequency of the switching elements, and capacitor compensating means is connected in series circuit relationship with the load.

---

This invention relates to means for converting electric power from direct (D-C) to alternating (A-C) form, and more particularly it relates to an improved inverter having well regulated, nearly sinusoidal output voltage.

Highly efficient electric power inversion can be accomplished by appropriately controlling the operations of a plurality of switching elements in alternative paths of load-current conduction between D-C input (source) terminals and A-C output (load) terminals of the inverter. The switching elements may comprise, for example, electric valves of the kind having the ability to hold off forward voltage until turned "on" by a suitable control or gate signal. One family of such valves is generally known by the names "controlled rectifier" or "thyristor," and we prefer to use this family in the present invention.

A controlled rectifier is a unidirectionally conducting device having an anode, a cathode, and a gate electrode. With forward voltage across its anode-to-cathode terminals (i.e., with the anode at a positive potential with respect to the cathode), it can be switched from a high-impedance blocking state to a low-forward-impedance conducting state by applying an electric signal of appropriate polarity, magnitude, and duration between the gate and cathode terminals. The signal that initiates this "triggering" or turn-on action is referred to hereinafter as a gate pulse. Once a controlled rectifier has switched to its on condition, the gate loses control and forward anode current will continue until subsequently extinguished by the action of external circuit components. Conduction can be stopped by reducing anode current below a minimum magnitude known as the holding current, or by diverting it from the rectifier by connecting thereacross a suitable source of reverse anode-to-cathode voltage. In either case, successful switching of the controlled rectifier to its "off" condition requires that re-application of forward voltage be delayed after forward current reaches zero until the device has had time to regain completely its forward-blocking capability.

Many different circuit configurations and operating modes have already been proposed for inverters wherein controlled rectifiers are used as the main switching elements. By cyclically turning on and off the respective rectifiers, an A-C output voltage is derived from the D-C power that is supplied to the inverter input terminals. Any such inverter has to include suitable means for reliably turning off each controlled rectifier at the conclusion of its prescribed interval of load-current conduction and for ensuring complete transfer of current from that "outgoing" rectifier to the next-conducting controlled rectifier (the "incoming" rectifier), which transfer is called "commutation."

In order to obtain the desired commutation, capacitive reactance may be introduced in series circuit relationship with the A-C output terminals of the inverter. In self-commutated series-capacitor sine wave inverters such as the one disclosed in U.S. Patent No. 3,120,633—Genuit, commutation is provided by series LC resonance circuits in which load current naturally oscillates to zero. For an interval determined by the resonant frequency of the circuit, a half cycle of current will be conducted by the controlled rectifier in series with a resonance circuit and the load. This rectifier stops conducting when the current drops to zero, and a gate pulse is then produced for turning on the incoming controlled rectifier which is poled to conduct the succeeding half cycle of reverse load current. Feedback diodes may be connected across the controlled rectifiers to limit voltage "overshoot" during the commutation periods and to avoid any discontinuity in load current.

The prior art inverters referred to in the preceding paragraph have certain practical limitations. They require relatively large and hence expensive reaction components compared to the size of the loads being supplied. Another shortcoming is their relatively poor regulating characteristics. The term "regulation" as used herein refers to the ability of an inverter to maintain a fixed relationship between output voltage magnitude and the amount of connected load. It often is desirable, for example, to have the output voltage remain essentially constant, without dropping or rising significantly, as load impedance changes between no load and full load conditions. Accordingly, a general object of our invention is to provide a lower cost sine wave inverter capable of operating with substantially constant voltage regulation over a wide range of loads.

Most of the relevant limitations can be avoided by employing the technical principles disclosed in U.S. Patent No. 3,242,415—King et al., and another object of the present invention is to provide such an inverter having improved circuitry and control features.

A more specific object is to provide a relatively inexpensive self-commutated inverter that is unusually well suited for supplying high frequency (e.g., 3,000 c.p.s.) sine wave voltage to a high power (e.g., 20,000 watts) leading power factor load.

In carrying out the invention in one form, a pair of A-C output terminals and the D-C source terminals of an inverter are interconnected by complementary first and second alternating current-conducting paths. Each path includes independent inductance means in series with a main switching element that preferably comprises at least one controlled rectifier shunted by an oppositely poled load-current carrying diode. The inductance means of the first path and the inductance means of the second path are not magnetically coupled.

Capacitance means is connected in effect in parallel circuit relationship with the output terminals of the inverter, whereby this means forms a series resonance circuit with each of the aforesaid first and second paths. The first path is connected and arranged so that its controlled rectifier will conduct current from the D-C source to the output terminals in a direction to contribute charge of relatively positive polarity to the capacitance means, while the second path is connected and arranged so that its controlled rectifier will conduct source current to the output terminals in the reverse direction to contribute negative-going charge to the capacitance means. Suitable gating means is provided to produce a succession of gate pulses for alternately turning on the respective controlled rectifiers at a predetermined operating frequency "$f_1$." The no-load resonant frequency "$f_o$" of each series resonance circuit is selected to be within the range of approximately $f_1$ to $2f_1$.

During each cycle of the inverter output voltage, the first and the second paths are therefore operative at separate but overlapping intervals to conduct a full cycle each of higher frequency oscillatory current, and the sum of the oscillatory currents in the respective paths is supplied to the parallel combination of the capacitance means and whatever load impedance is connected across the output terminals of the inverter. Due to its integrating effect the capacitance means ensures an approximate sine wave output voltage from no load to full load conditions. The inverter is capable of operating under no-load conditions. We add series-capacitor compensating means in the load circuit to obtain surprisingly constant voltage regulation over a relatively wide load range and to prevent commutation failure in the event of a load impedance short circuit. The inverter voltage is varied by varying the frequency of the gate pulses supplied to the controlled rectifiers.

Our invention will be better understood and its various objects and advantages will be more fully appreciated from the following description taken in conjunction with the accompanying drawings in which:

FIG. 1 is a schematic circuit diagram of a basic electric power inverter;

FIG. 2 is a schematic circuit diagram of a modified form of the FIG. 1 inverter;

FIG. 3 is another schematic diagram of the inverter showing our improvements in greater detail;

FIG. 4 is a chart of current and voltage vs. time for the inverter under no-load and loaded conditions;

Figure 5:
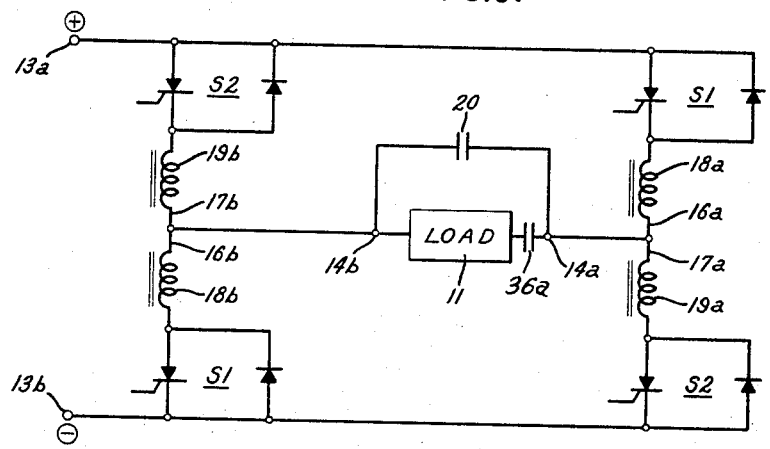
FIG. 5 is a schematic circuit diagram of another configuration of the basic inverter.

Referring now to FIG. 1, a suitable source of D-C electric power is connected to an alternating current load 11 by means of an electric power inverter. The D-C source is there shown as a pair of series connected batteries 12 that form a center-tapped supply for energizing relative positive and negative D-C input terminals 13a and 13b, respectively, and a neutral input terminal 13n of the inverter. The load 11, shown symbolically in FIG. 1, is connected across the inverter's output or load terminals 14a and 14b.

The input and output terminals of the inverter are interconnected by means including a conductor 15 and complementary first and second alternating current-conducting paths 16 and 17. The conductor 15 is connected directly between the neutral input terminal 13n and the output terminal 14b. The first path 16, which includes a bidirectionally conducting switching element S1 in series with an independent inductance element 18 of L henrys, is connected between the relatively positive input terminals 13a and the output terminal 14a. The second path 17, also including a bidirectionally conducting switching element S2 in series with another independent inductance element 19 of L henrys, is employed to connect the same output terminal 14a to the relatively negative input terminal 13b. To complete the inverter circuitry a capacitor 20 of C farads is connected in parallel circuit relationship with the output termials 14a and 14b. Preferably there is *no* series capacitance element in either of the separate paths 16 and 17, and the inductance elements 18 and 19 are *not* magnetically coupled.

It is apparent in FIG. 1 that with the switching element S1 in a conducting state, the first path 16 will permit the upper branch of the D-C source 12 to supply source current to the parallel combination of the capacitor 20 and the load 11 in a given "forward" direction, while the second path 17 (with the switching element S2 in a conducting state) will enable source current to flow from the lower branch of the source through this combination in the opposite or "reverse" direction. By controlling the operations of switch elements S1 and S2 and selecting the parameters of reactive elements 18–20 in the manner explained in detail below, the inverter will operate to develop at its output terminals an alternating voltage of nearly sinusoidal wave form over a relatively wide range of load variations between no-load (essentially open circuit) and full-load (minimum connected load impedance) conditions. When in accordance with our invention the inverter is used with a load having the predetermined power factor that is hereinafter identified, it inherently maintains a nearly constant output voltage magnitude over substantially the entire load range.

The switching elements S1 and S2 are alternately switched from non-conducting (high impedance) to conducting (negligible impedance) states at a predetermined operating frequency $f_1$ (e.g. 3,000 c.p.s.). The series resonance circuit that is formed by the capacitor 20 and an inductance element 18 or 19 when only one of the two switching elements is conducting is tuned so that its no-load resonant frequency is substantially within the range of approximately $f_1$ to approximately $2f_1$. In other words, $$1 \leq \frac{1}{2\pi f_1 \sqrt{LC}} \leq 2$$

(We have obtained particularly advantageous results by using a ratio of $f_o$ to $f_1$ of 1.35). Thus each of the paths 16 and 17 will conduct an oscillatory current having a natural frequency that is higher than $f_1$ but lower than twice $f_1$. The respective switching elements are each arranged to revert to a non-conducting state after an interval of conduction just equal to the period of a full cycle of this oscillatory current.

With the operating mode described in the preceding paragraph, reverse current will already be flowing in the first path 16 at the moment the switching element S2 of the complementary path 17 is switched to a conducting state, and, similarly, forward current will be flowing in the latter path at the moment that the switching element S1 of the first path is switched to its conducting state. Consequently, for some finite portion of each half cycle of inverter operation the conducting periods of the two paths 16 and 17 overlap, and throughout this overlap the individual oscillatory currents are in directional agreement. The sum of the currents in the respective paths is supplied to the parallel combination of capacitor 20 and load 11. This operation will be better understood and its implications and advantages will become apparent from the description of FIGS. 3 and 4 set forth hereinafter.

The switching elements S1 and S2 can be of any suitable construction capable of operating in the prescribed manner. For purposes of illustration we have shown a solid-state controlled rectifier shunted by an oppositely-poled auxiliary load-current carrying power diode. Thus, as can be seen in FIG. 1, the switching element S1 comprises a controlled rectifier CR1 with an auxiliary diode D1 connected thereacross, the cathode of diode D1 being connected to the anode of controlled rectifier CR1 which is connected in turn to the relatively positive input terminal 13a of the inverter. Similarly, the switching element S2 comprises a controlled rectifier CR2 with an auxiliary diode D2 connected thereacross, the anode of the diode D2 being connected to the cathode of the controlled rectifier CR2 which is connected in turn to the relatively negative input terminal 13b. Each of the controlled rectifiers CR1 and CR2 can be switched to a conducting state (turned on) by energizing its gate electrode g with a gate pulse. While CR1 is "on" it conducts current from the D-C source 12 to the inverter output terminals 14a and 14b in the given forward direction, and while CR2 is "on" it conducts source current to the output terminals in the reverse direction.

Any suitable trigger circuit can be used to produce a succession or train of gate pulses that are applied to the controlled rectifier gates for alternately turning on CR1 and CR2 at the predetermined operating frequency $f_1$. Typical circuits for this purpose are disclosed in Chapter 5, pages 190–247 of Semiconductor Controlled Rectifiers by F. E. Gentry et al. (Prentice-Hall, Englewood Cliffs, N.J., 1964).

A controlled rectifier stops conducting at the end of the first loop of the oscillatory current in the associated path, at which point the current magnitude is zero. The auxiliary diode then takes over to conduct the succeeding oppositely-poled loop of oscillatory current. During the time that the diode is conducting, a small reverse anode-to-cathode voltage will be maintained across the companion controlled rectifier, and successful turn-off of this device is assured. Hence the conducting interval of the auxiliary diode establishes the circuit turn-off time, i.e. the time available for a controlled rectifier to turn off. Due to the presence in the respective paths 16 and 17 of the inductance elements 18 and 19, the diode is able to continue conducting, even though the controlled rectifier of the opposite switching element has been turned on, until the conclusion of the second loop of the oscillatory current, at which point it automatically reverts to a blocking state. The switching element thereafter remains in a non-conducting condition until its controlled rectifier is again turned on by the next gate pulse. Thus a self-commutated inverter operation is obtained.

Those skilled in the art will appreciate that for relatively high current or voltage ratings of the inverter a plurality of simultaneously operated controlled rectifiers can be disposed in parallel or in series with each other in each of the switching elements S1 and S2. Fewer auxiliary diodes than controlled rectifiers could be used in each switching element is desired.

In FIG. 2 a modified form of the same basic inverter configuration has been shown. We will identify and describe only the features that are different. Instead of batteries, the source of D-C power for the FIG. 2 inverter comprises rectified A-C electric power. Toward this end a suitable supply 22 of commercial power is connected across the A-C terminals of a diode bridge rectifier 23 whose D-C terminals are connected to the relatively positive and negative input terminals 13a and 13b of the inverter. A smoothing capacitor 24 is connected across the D-C terminals of the bridge rectifier 23, and a filtering coil 25 is connected between the positive bridge terminal and the input terminal 13a. A voltage divider comprising two relatively large capacitors 26 and 27 in series is connected across the input terminals 13a and 13b, and the center tap of this divider comprises the neutral input terminal 13n of the inverter.

In the FIG. 2 inverter the means for interconnecting the input and output terminals includes an output transformer 30 having a primary winding 31 and a secondary winding 32. The load 11 is connected across the secondary winding 32 of this transformer. One end terminal 31b of the primary winding 31 is connected directly to the neutral input terminal 13n, and the other end terminal 31a of this winding is connected to the junction of the complementary first and second alternating current-conducting paths 16 and 17. Thus the reflected impedance of the load 11 appears in the same relative circuit position as the load of FIG. 1.

In the FIG. 2 inverter a capacitor 20a has been connected between the right-hand end terminal 31a of the transformer primary winding and the relatively positive input terminal 13a of the inverter, and another capacitor 20b has been connected between the same terminal 31a and the relatively negative input terminal 13b. The value of the capacitance of each of the capacitors 20a and 20b is 0.5C farads. Those skilled in the inverter art will recognize that this has the same effect as connecting a single capacitor of C farads in parallel circuit relationship with the transformer winding 31. The voltage divider 26, 27 presents negligible impedance to the high-frequency alternating current that traverses winding 31.

In order to limit the maximum rate of rise of voltage across each of the switching elements S1 and S2 when the auxiliary diode of that element stops conducting, a series resistor-capacitor "snubber" circuit 33–34 may be connected across the element as is shown in FIG. 2.

FIG. 3 depicts in greater detail a particular load circuit for the FIG. 1 inverter. Between the output terminals 14a and 14b of the FIG. 3 inverter there is serially connected an output transformer 35 and compensating means 36. The compensating means 36, about which more will soon be said, comprises a capacitor 37 that is preferably connected in the load circuit by means of a current transformer 38 as shown. The secondary winding of the output transformer 35 is connected through a switch 41 (shown open) to a leading power factor load 39, 40 comprising resistance and capacitance in series. Additional resistance-capacitance load 43, 44 can be connected across the transformer 35 by closing another switch 45. Typically the power factor of the connected load might be .707 lead, and the capacitance of the compensating means 36 in series therewith might be 2.5C farads. When connected to the high side of a current transformer 38 having a 1:10 turns ratio, a high voltage capacitor 37 of only 0.025C farad will reflect the prescribed value.

The operation of the previously described inverter will be better understood by considering FIG. 4 which is a chart of certain current and voltage wave trains recorded in a computer-simulated version of the basic inverter. Five cycles of inverter operation have been shown, with a load impedance of $$\frac{1.67}{2\pi f_1 C}$$

ohms at a leading .975 power factor being applied after the second no-load cycle (at time $t_x$). A figure of 1.35 was used for the ratio of $f_0$ to $f_1$.

In FIG. 4 the top wave train, labeled $i_1$, depicts oscillatory current flowing in the first path 16 of the inverter circuit. This current is in the forward or positive direction when CR1 is conducting, and it is in the reverse or negative direction when D1 is conducting (see FIG. 3). The next wave train, labeled $i_2$, depicts the oscillatory current flowing in the complementary path 17 of the inverter, this current being in the forward or positive direction when D2 is conducting and being in the reverse or negative direction when CR2 is conducting (again see FIG. 3). The third current wave train, labeled $i_1+i_2$, represents the sum of the previous currents. This is the current supplied to the capacitor 20 in parallel with the connected load. The resulting output voltage is shown by the bottom wave train, labeled $v$.

The sequence of events during a complete cycle of no-load operation will now be reviewed. At time $t_0$ (see FIG. 4) a gate pulse is applied to the controlled rectifier CR1 and forward current $i_1$ starts flowing in the first path 16. Between $t_0$ and $t_1$ both switching elements S1 and S2 are in their conducting states. Forward current is flowing through the auxiliary diode D2 of the complementary path 17 as well as through CR1. During this period of overlap the sum of the component forward currents $i_1$ and $i_2$ is supplied to the capacitor 20, and the whole circuit behaves like a series resonance circuit comprising a capacitor of C farads in series with a parallel combination of two inductors of L henrys each. The resonant frequency of such a circuit is $\sqrt{2}f_0$. The capacitor is charged by the summation current in a positive sense (i.e., the potential of output terminal 14a relative to 14b becomes more positive than it was), and its voltage will change from negative to positive during this overlap period.

At time $t_1$ the forward current in the diode D2 oscillates to zero and the switching element S2 consequently reverts to its non-conducting state. Between $t_1$ and $t_2$ only the switching element S1 is conducting; $i_2$ is zero. During this interval the current $i_1$ in the first path 16 oscillates at resonant frequency $f_o$ to zero (CR1 turns off) and reverses (D1 starts conducting). Reverse current contributes negative-going charge to the capacitor 20.

At time $t_2$, which occurs exactly one-half cycle ($1/2f_i$ second) after $t_0$, a gate pulse is applied to the controlled rectifier CR2 and reverse current $i_2$ starts flowing in the complementary path 17. Between $t_2$ and $t_3$ both switching elements S1 and S2 are again in their conducting states. Negative current is flowing through the auxiliary diode D1 of the first path 16 as well as through CR2. During this period of overlap the sum of the component reverse currents $i_2$ and $i_1$ is supplied to the capacitor 20 which is charged thereby in a negative sense. The capacitor voltage changes from positive to negative during the overlap period.

At time $t_3$ the current in the diode D1 oscillates to zero and the switching element S1 consequently reverts to its non-conducting state. Between $t_3$ and $t_4$ only the switching element S2 is conducting; $i_1$ is zero. During this interval the current $i_2$ in the complementary path 17 oscillates at resonant frequency to zero (CR2 turns off) and begins to flow in the opposite or forward direction through the auxiliary diode D2. Forward current contributes charge of relatively-positive polarity to the capacitor 20 whose voltage, however, is still negative at time $t_4$ which marks the end of one complete cycle of inverter operation.

So long as their is no dissipative load connected across the inverter output terminals, the average magnitude of the oscillatory current $i_1$ (or $i_2$) is zero and, as is apparent in FIG. 4, the successive positive and negative loops of this current are symmetrical. Later, after load is applied in parallel with the capacitor 20, these loops will be unequal. Now the average magnitude of $i_1$ (or $i_2$) represents the magnitude of current delivered to the real power consuming load. Although loading the inverter increases the magnitude and duration of the first loop of oscillatory current (corresponding to the conducting time of the associated controlled rectifier), it has only a minor effect on resonant frequency, and the duration of the second loop is still sufficient to ensure successful turnoff of the controlled rectifier. The above-mentioned periods of overlap are not substantially changed, and the foregoing review of no-load operation remains valid when load is applied.

FIG. 4 shows that the inverter output voltage $v$ is nearly sinusoidal under both no-load and loaded steady-state conditions. This results from the voltage attenuating effect of the capacitor 20 on the harmonic components of the summation current. The harmonic content of the resulting voltage is very small and can be further reduced if desired by making the ratio of $f_o$ to $f_i$ lower than 1.35. (However, it should be noted that decreasing this ratio tends to increase the cost of the inverter since comparatively large reactive components will be required.)

FIG. 4 also shows that the output voltage $v$ has essentially the same peak magnitude under both no-load and loaded steady-state conditions. This is the result of the inverter being able to deliver increasing amounts of power for increasing loads. However, at power factors other than approximately .975 leading, an inherently flat voltage regulating characteristic is not obtained. Regulation would be aided for leading power factor loads by increasing the ratio of $f_o$ to $f_i$.

At a load power factor of approximately 0.7 lead, the output voltage magnitude will rise linearly with increasing load. By using a series-capacitor compensating means 36 of proper reactance value with such a load (see FIG. 3), we are able to maintain the magnitude of voltage across the load impedance substantially constant between no-load and full-load conditions. This is because the voltage drop across the compensating means increases by approximately the same amount as the inverter output voltage increases as the load impedance is varied from no-load (maximum impedance) to full-load (minimum load impedance) conditions. The compensating means additionally improves the performance of our inverter by reducing the degree of depression of the circuit turn-off time with increasing load.

The output power capabilities of our inverter are dependent on the ratio of the capacitance value C of the capacitor 20 to the inductance value L of one of the inductors 18 and 19. Increasing the magnitude of C relative to L will increase the peak magnitude (which is proportional to $\sqrt{C/L}$) of the oscillatory current in each of the paths 16 and 17, thereby enabling the inverter to supply a heavier load. The practical upper limit of this ratio is determined by the need to preserve reliable commutation under all steady-state and transient load conditions that will be encountered.

For a given load, the output voltage magnitude of the inverter can be varied by appropriately controlling the magnitude of the D-C input voltage, the inverter operating frequency, or the parameters of the reactive components 18–20. Output voltage magnitude is increased by increasing the magnitude of input voltage or of $f_i$, L, or C.

For practicing our invention we presently prefer to use a bridge configuration, such as that shown in FIG. 5 or 6 which will now be described. A set of only two D-C input terminals 13a and 13b is required in this configuration. These terminals and the A-C output terminals 14a and 14b of the inverter are interconnected by means of a first alternating current-conducting path having two serially related sections 16a and 16b and a second or complementary alternating current-conducting path having two serially related sections 17a and 17b. As can be seen in FIG. 5, the section 16a is formed by a switching element S1 in series with an inductance element 18a (of 0.5L henrys), and it is connected from the relatively positive input terminal 13a to the output terminal 14a. The companion section 16b, including another switching element S1 in series with a similar inductance element 18b of 0.5L henrys, is connected from the output terminal 14b to the relatively negative input terminal 13b. The section 17a of the second path, which section is formed by a switching element S2 in series with an inductance element 19a of 0.5L henrys, is connected from the relatively negative input terminal 13b to the inverter output terminal 14a, while the companion section 17b, including a duplicate switching element S2 in series with yet another inductance element 19b of 0.5L henrys, is connected from the output terminal 14b to the positive input terminal 13a.

With this arrangement the first path enables source current from the input terminals of the inverter to flow in the forward direction with respect to the output terminals 14a and 14b, and the second path enables source current to flow in the reverse direction with respect to the output terminals 14a and 14b. A capacitor 20 of C farads is connected, as before, in parallel circuit relationship with the terminals 14a and 14b. If desired, another capacitor 36a of appropriate value can be connected in series with the load 11 between the output terminals to serve the same purpose as the series-capacitor compensating means previously described.

In the mode of operation contemplated for FIG. 5, the switching elements S1 in the respective sections 16a and 16b that comprise the aforesaid first path are both operated simultaneously, at a frequency of $f_i$, while both of the switching elements S2 in the respective sections 17a and 17b of the second path are switched to conducting states midway between successive operating points of S1. The series resonance circuit formed by the capacitor 20 and the two inductance elements 18a and 18b (or 19a and 19b) when only one of the complementary paths is conducting is tuned so that its no-load resonant frequency $$\frac{1}{2\pi\sqrt{LC}}$$

is substantially within the range of approximately $f_1$ to approximately $2f_1$. Thus an oscillatory current flows through each path. The conducting periods of the respective switching elements S1 and S2, which are each arranged to revert to a non-conducting state after conducting a full cycle of oscillatory current, will partially overlap during each half cycle of inverter operation.

It should now be apparent that the operation of this bridge inverter is the same as that of the center-tapped supply inverters previously described. If desired, the inductance element 18a can be magnetically coupled to the element 18b and the inductance element 19a can be coupled to 19b, in which case an inductance value of 0.25L would be used for each element.

Figure 6:
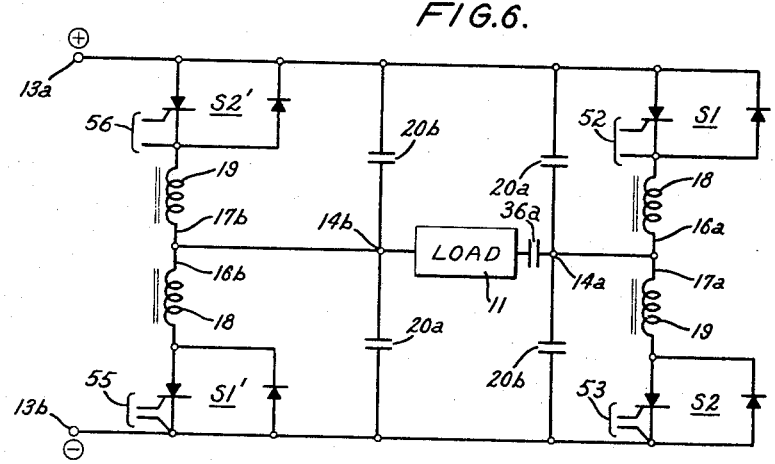
FIG. 6 is a schematic circuit diagram of a modified form of the FIG. 5 inverter.

With the modifications illustrated by FIG. 6, an even more versatile bridge configuration can be obtained. The single capacitor of C farads across the inverter output terminals is replaced by an equivalent arrangement of two pairs of smaller capacitors 20a and 20b, each having a capacitance value of 0.5C farads. The capacitors 20a are respectively connected across the two sections 16a and 16b of the first alternating current-conducting path, and the capacitors 20b are respectively connected across the two sections 17a and 17b of the complementary path. The D-C source that energizes the input terminals 13a and 13b will have negligible A-C impedance. An independent inductance element 18 of L henrys is included in each of the sections 16a and 16b, and an independent inductance element 19 of L henrys is included in each of the sections 17a and 17b. The resonance circuit formed by connecting a parallel combination of two capacitors 20a and 20b in series with an inductance element 18 (or 19) of each section is tuned so that its no-load resonant frequency is higher than approximately $f_1$ but lower than approximately $2f_1$.

The switching elements in the sections 16b and 17b of the FIG. 6 inverter are identified by the reference characters S1' and S2', respectively. If S1' were switched from a nonconducting to a conducting state simultaneously with S1, and S2' simultaneously with S2, the inverter operation would be virtually the same as that of the FIG. 5 inverter, with the advantage of being even less sensitive to changes in the connected load. If the operating points of S1' and S2' were retarded with respect to the companion elements S1 and S2, respectively, the FIG. 6 inverter would continue operating successfully but its output voltage level would be reduced. This is therefore another means for controlling the output voltage magnitude of my inverter. The FIG. 6 arrangement can be readily adapted for polyphase inverter applications.

Figure 6A:
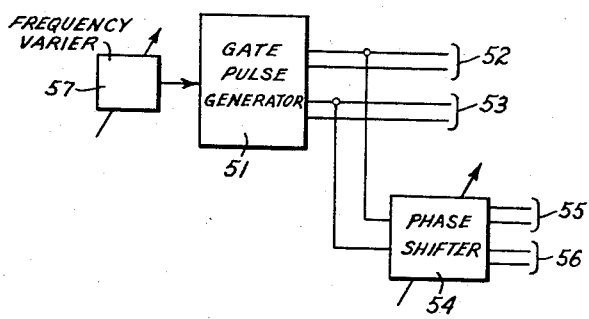
FIG. 6A is a schematic block diagram of typical means that can be used to control the inverter shown in FIG. 6.

Typical control means for the FIG. 6 inverter is shown in FIG. 6A. A gate pulse generator 51 of conventional design (see the Gentry et al. text, supra) produces a train of gate pulses that are sequentially applied to the gate circuits 52 and 53 of the switching elements S1 and S2, respectively, for alternately triggering these elements. An appropriate phase shifter 54 delays the application of trigger signals to the gate circuits 55 and 56 of the companion switching elements S1' and S2', respectively. In this manner, each switching moment of S1' can be retarded with respect to the corresponding switching moment of S1, and the switching moment of S2' can be similarly retarded with respect to the corresponding switching moment of S2. The amount of retard, and hence the average magnitude of the voltage energizing the load 11, can be varied as desired by adjusting the phase shifter 54. FIG. 6A also illustrates means 57 for varying the frequency of the gate pulses produced by the gate pulse generator 51. As was previously mentioned, this is another way to control the average magnitude of the voltage applied to the load.

While we have shown and described different forms of the invention by way of illustration, other modifications will undoubtedly occur to those skilled in the art. We therefore contemplate by the claims that conclude this specification to cover all such modifications as fall within the true spirit and scope of the invention.

What we claim as new and desire to secure by Letters Patent of the United States is:

1. In an electric power inverter:
   (a) a plurality of input terminals adapted to be connected to a source of direct current;
   (b) a pair of output terminals adapted to be connected to an alternating current load;
   (c) first capacitance means connected in series with said load between said output terminals;
   (d) second capacitance means of C farads connected effectively in parallel circuit relationship with said output terminals; and
   (e) means for electrically interconnecting said input and output terminals, said interconnecting means including complementary first and second alternating current-conducting paths with each of said paths including independent inductance means of L henrys in series with bidirectionally conducting switching means, said first path being disposed to enable source current to flow in a given forward direction with respect to said output terminals and said second path being disposed to enable source current to flow in a reverse direction with respect to said output terminals;
   (f) the respective switching means of said first and second being alternately switched, at a predetermined operating frequency, from a non-conducting state to a conducting state and being arranged after conducting a full cycle of oscillatory current to revert to said non-conducting state;
   (g) the magnitudes of C and L being selected so that the quantity $$\frac{1}{2\pi\sqrt{LC}}$$

is higher than approximately said predetermined operating frequency but lower than approximately twice said predetermined operating frequency, whereby the conducting periods of the respective switching means will partially overlap during each half cycle of inverter operation.

2. The inverter of claim 1 in which said predetermined operating frequency is approximately 3,000 cycles per second and said quantity $$\frac{1}{2\pi\sqrt{LC}}$$

is equal to approximately 4,050.

3. An electric power inverter comprising:
   (a) positive, negative, and neutral input terminals adapted to be connected to a center-tapped D-C supply;
   (b) a pair of output terminals adapted to be connected to an A-C load;
   (c) capacitor compensating means connected in series circuit relationship with the A-C load;
   (d) capacitance means connected effectively in parallel circuit relationship with the sereis combination of said compensating means and the load; and
   (e) means for electrically interconnecting said input and output terminals, said interconnecting means including a first alternating current-conducting path for connecting said positive input terminal to a predetermined one of said output terminals, a second alternating current-conducting path for connecting the same output terminal to said negative input terminal, and means for connecting said neutral input terminal to the other output terminal;

(f) each of said first and second paths including a bidirectionally conducting switching element in series with independent inductance means, the respective switching elements of said paths being alternately switched, at a predetermined operating frequency, from a non-conducting state to a conducting state and being arranged to revert to said non-conducting state after a conducting period depending on the resonant frequency of a circuit comprising said capacitance means and said inductance means in series;

(g) said resonant frequency being selected to be higher than approximately said predetermined operating frequency but lower than approximately twice said predetermined operating frequency.

4. The inverter of claim 3 in which said interconnecting means includes an output transformer having primary and secondary windings, with the primary winding being connected between said neutral input terminal and the junction of said first and second paths and the secondary winding being adapted to be connected to the A-C load.

5. An electric power inverter comprising:
 (a) relatively positive and negative input terminals adapted to be energized by D-C electric power;
 (b) first and second output terminals adapted to be connected to an A-C load;
 (c) capacitance means connected effectively in parallel circuit relationship with said output terminals; and
 (d) complementary first and second alternating current-conducting paths, each path including in series a pair of bidirectionally conducting switching elements and a pair of mutually coupled inductance elements, said first path being divided into two duplicate sections which respectively connect said positive input terminal to said first output terminal and said second output terminal to said negative input terminal and said second path being divided into two duplicate sections which respectively connect said positive input terminal to said second output terminal and said first output terminal to said negative input terminal;
 (e) the respective switching elements of said first and second paths being alternately switched, at a predetermined operating frequency, from a non-conducting state to a conducting state and being arranged to revert to said non-conducting state after a conducting period equal to the period of one full cycle of current therein;
 (f) the parameters of said capacitance means and of said mutually coupled inductance elements being so selected that the reciprocal of said period is higher than approximately said predetermined operating frequency but lower than approximately twice said predetermined operating frequency.

6. In an electric power inverter that generates a nearly sinusoidal voltage for energizing an A-C load:
 (a) relatively positive and negative input terminals adapted to be connected to a D-C power source;
 (b) complementary first and second alternating current-conducting paths connected in series with each other between said input terminals, each of said first and second paths including an independent inductor of L henrys in series with a bidirectionally conducting switching element, the respective switching elements of said first and second paths being alternately switched, at a predetermined operating frequency, from non-conducting to conducting states and each being arranged to revert to its non-conducting state after conducting a full cycle of alternating current;
 (c) complementary third and fourth alternating current-conducting paths connected in series with each other between said input terminals, each of said third and fourth paths including an independent inductor of L henrys in series with a bidirectionally conducting switching element, the respective switching elements of said third and fourth paths being alternately switched, at said predetermined operating frequency, from non-conducting to conducting states and each being arranged to revert to its non-conducting state after conducting a full cycle of alternating current;
 (d) means adapted to connect the A-C load between the junction of said first and second paths and the junction of said third and fourth paths, said means including series-capacitor compensating means connected effectively in series circuit relationship with said load; and
 (e) first and second pairs of series-connected capacitors, each of 0.5C farads, connected in parallel between said input terminals, with the junction of the capacitors that form said first pair being connected to said junction of the first and second paths and the junction of the capacitors that form said second pair being connected to said junction of the third and fourth paths;
 (f) the magnitudes of L and C being selected so that the quantity $$\frac{1}{2\pi\sqrt{LC}}$$

is higher than approximately said predetermined frequency but lower than approximately twice said predetermined frequency.

7. The inverter of claim 6 in which each of said bidirectionally conducting switching elements comprises at least one controlled rectifier shunted by an oppositely poled diode, said controlled rectifier having a gate that is adapted to be energized by a succession of gate pulses for turning on the controlled rectifier at said predetermined operating frequency.

8. The inverter of claim 7 in which the magnitude of the voltage energizing the A-C load is decreased by lowering the frequency of said gating pulses below said predetermined operating frequency.

9. In an electric power inverter that generates a nearly sinusoidal voltage for energizing an A-C load:
 (a) relatively positive and negative input terminals adapted to be connected to a D-C power source;
 (b) complementary first and second alternating current-conducting paths connected in series with each other between said input terminals, each of said first and second paths including an independent inductor of L henrys in series with a bidirectionally conducting switching element, the respective switching elements of said first and second paths being alternately switched, at a predetermined operating frequency, from non-conducting to conducting states and each being arranged to revert to its non-conducting state after conducting a full cycle of alternating current;
 (c) complementary third and fourth alternating current-conducting paths connected in series with each other between said input terminals, each of said third and fourth paths including an independent inductor of L henrys in series with a bidirectionally conducting switching element, the respective switching elements of said third and fourth paths being alternately switched, at said predetermined operating frequency, from non-conducting to conducting states and each being arranged to revert to its non-conducting state after conducting a full cycle of alternating current;
 (d) means for controlling the moments at which the switching elements are respectively switched from non-conducting to conducting states;
 (e) means adapted to connect the A-C load between the junction of said first and second paths and the junction of said third and fourth paths, the magnitude of the voltage energizing the load being decreased by retarding the switching moment of the switching element of said fourth path with respect to the corresponding switching moment of the companion element of said first path, and by similarly retarding the switching moment of the switching element of said third path with respect to the corresponding switching moment of the companion element of said second path;

(f) first and second pairs of series-connected capacitors, each of 0.5C farads, connected in parallel between said input terminals, with the junction of the capacitors that form said first pair being connected to said junction of the first and second paths and the junction of the capacitors that form said second pair being connected to said junction of the third and fourth paths;

(g) the magnitudes of L and C being selected so that the quantity $$\frac{1}{2\pi\sqrt{LC}}$$

is higher than approximately said predetermined frequency but lower than approximately twice said predetermined frequency.

10. In an electric power inverter that applies a nearly sinusoidal voltage to an A-C load:
(a) a set of input terminals adapted to be energized by D-C electric power;
(b) a set of output terminals adapted to be connected to the A-C load;
(c) capacitance means connected effectively in parallel circuit relationship with said output terminals;
(d) means for electrically interconnecting said input and output terminals, said interconnecting means including complementary first and second alternating current-conducting paths with each of said paths including bidirectionally conducting switching means in series with independent inductance means, said first path being connected between one terminal of one of said sets of terminals and a predetermined terminal of the other set and said second path being connected between said predetermined terminal and another terminal of said one set;
(e) the respective switching means of said first and second paths being alternately switched, at a predetermined normal frequency, from a non-conducting state to a conducting state and being arranged to revert to said non-conducting state after a conducting period depending on the resonant frequency of a circuit comprising said capacitance means and inductance means in series, said resonant frequency being selected to be higher than approximately said predetermined normal frequency but lower than approximately twice said predetermined normal frequency; and
(f) means for lowering the actual switching frequency of said respective switching means below said predetermined normal frequency, thereby decreasing the magnitude of voltage applied to said A-C load.

11. An electric power inverter comprising:
(a) relatively positive and negative input terminals adapted to be energized by D-C electric power;
(b) first and second output terminals adapted to be connected to an A-C load;
(c) first capacitance means connected effectively in series with said load between said output terminals;
(d) second capacitance means connected effectively in parallel circuit relationship with said output terminals; and
(e) complementary first and second alternating current-conducting paths, each path including in series a pair of bidirectionally conducting switching elements and separate inductance means, said first path being divided into two dupuplicate sections which respectively connect said positive input terminal to said first output terminal and said second output terminal to said negative input terminal, and said second path being divided into two duplicate sections which respectively connect said positive input terminal to said second output terminal and said first output terminal to said negative input terminal;
(f) the respective switching elements of said first and second paths being alternately switched, at a predetermined operating frequency, from a non-conducting state to a conducting state and being arranged to revert to said nonconducting state after a conducting period depending on the resonant frequency of a circuit comprising said second capacitance means and said inductance means in series;
(g) said resonant frequency being selected to be higher than said predetermined operating frequency but lower than approximately twice said predetermined operating frequency.

12. The inverter of claim 11 which additionally comprises an output transformer having primary and secondary windings and a current transformer having low and high windings, said primary winding and said low winding being serially connected between said output terminals, said secondary winding being adapted to be connected to the A-C load, and said first capacitance means being connected across said high windings.

References Cited

UNITED STATES PATENTS

| 3,131,343 | 4/1964 | Reinert | 321—16 |
| 3,242,415 | 3/1966 | King et al. | 321—15 |
| 3,257,604 | 6/1966 | Colclaser et al. | 321—45 |
| 3,263,152 | 7/1966 | Walker | 321—45 |
| 3,286,155 | 11/1966 | Corey | 321—45 |
| 3,303,406 | 2/1967 | Bedford | 321—44 |
| 3,308,371 | 3/1967 | Studtmann | 321—45 |
| 3,316,476 | 4/1967 | Olson et al. | 321—45 |
| 3,317,815 | 5/1967 | Merritt | 321—45 |

JOHN F. COUCH, *Primary Examiner.*

W. M. SHOOP, JR., *Assistant Examiner.*